3,642,648
PREPARATION OF DISPERSIONS OF FINELY DIVIDED ALKALI METALS

Gerald J. Orazem and Kenneth R. Martin, Gastonia, Matthew H. Dellinger, Cherryville, and William S. Leonhardt, Bessemer, N.C., assignors to Lithium Corporation of America, New York, N.Y.
No Drawing. Filed Feb. 4, 1969, Ser. No. 796,614
Int. Cl. C09k 3/00
U.S. Cl. 252—182                                       10 Claims

ABSTRACT OF THE DISCLOSURE

Dispersions of finely divided alkali metals in inert liquid hydrocarbons are made by utilizing as the dispersing agent a polyhydrocarbon resin, such as a cross-linked polystyrene resin, which is soluble or colloidally dispersible in said iner liquid hydrocarbon.

---

Our invention is directed to the production of dispersions of finely divided alkali metals in inert liquid hydrocarbons, said dispersions being characterized by certain improvements in their properties in relation to heretofore known alkali metal dispersions.

The preparation of dispersions of finely divided alkali metals, for instance, sodium, potassium or lithium, of a particle size in the range of about 1 to 50 microns, in inert liquid hydrocarbons has long been known and is disclosed in numerous patents, illustrative of which are U.S. Pats. Nos. 2,910,347 and 3,329,666. Such dispersions are prepared by admixing an alkali metal in molten form in an inert liquid hydrocarbon medium, and then cooling the resulting dispersion or allowing the dispersion to cool. It is common commercial practice, in the preparation of such alkali metal dispersions, to utilize mineral oils as the inert liquid hydrocarbon in which the alkali metal is dispersed, and, to stabilize said dispersions, to carry out the production of the dispersion in the presence of a long chain fatty acid such as stearic acid or a salt of such acid such as aluminum stearate as the dispersing agent. The resulting dispersions are very difficult to filter at best, and they have a tendency to form gels which make the dispersions virtually impossible to filter.

We have discovered that improved ease of filterability of dispersions of finely divided alkali metals in inert liquid hydrocarbons, such as mineral oils, is obtained by utilizing, as the dispersing agent, certain polyhydrocarbon resins which are soluble or colloidally dispersible in the inert liquid hydrocarbon, notably cross-linked polystyrene resins. Such improved ease of filterability appears to be due to differences in the shapes of the dispersed alkali metal particles when stearic acid (or its salts) is used as the dispersing agent and when certain of the polyhydrocarbon resins, such as the cross-linked polystyrene resins, are employed as the dispersing agent. Thus, in the case of the use of stearic acid or its salts, the particles of the dispersed alkali metal are spherical or nearly so. However, where cross-linked polystyrenes are used, the particles of the dispersed alkali metals are generally cylindrical or substantially so. Thus, the latter alkali metal dispersons are easier to filter, gelation is largely avoided, and clogging of the filter is substantially reduced and, in many cases, essentially eliminated. Furthermore, where the lithium metal dispersions are used to produce alkyllithiums or aryllithiums as, for instance, in the production of n-butyllithium where lithium chloride muds are formed from which the n-butyllithium is removed by filtration, the use of cross-linked polystyrene resins as stabilizing agents for the lithium metal dispersion produces substantially improved filtration. Thus, in an illustrative case in which n-butyllithium was prepared from a lithium metal dispersion in mineral oil, and said n-butyllithium was filtered off from the accompanying lithium chloride mud, a lithium metal dispersion using a cross-linked polystyrene resin gave a filtration rate of the n-butyllithium of 120 ml./minute as against a filtration rate of 50 ml./minute where stearic acid was used as the stabilizing agent for the lithium metal dispersion.

The polyhydrocarbon resins are, per se, well known in the art and many types thereof can be utilized provided, as stated above, that they are soluble or colloidally dispersible in the inert liquid hydrocarbon which is used as the dispersing medium. Thus, solely by way of illustration, the polyhydrocarbon resins include polyethylenes, polypropylenes, polybutylenes, and linear polystyrenes. Especially effective for the purposes of our present invention, as noted above, are cross-linked polystyrene resins, and the use thereof represents a particularly important, though limited, embodiment of our invention. Illustrative of such cross-linked polystyrene resins is the resin sold commercially under the trade designation "Dow QX-3487" (The Dow Chemical Company).

Over and above improved ease of filterability which is obtained using certain of the polyhydrocarbon resins, certain other advantages result from their use pursuant to the present invention. Since the polyhydrocarbon resins do not contain oxygen, oxidation of the alkali metal particles is wholly avoided with resultant increase in the purity of the alkali metal dispersion. In addition, the alkali metal dispersions made with the polyhydrocarbon resins tend to be more reactive when used in the preparation of organometallic compounds such as, for example, n-butyllithium and other alkyllithiums.

As stated above, the polyhydrocarbon resins suitable for use in accordance with the present invention must be either soluble or colloidally dispersible in the inert liquid hydrocarbon medium in which the alkali metal is dispersed so that said resins can become reasonably evenly distributed on the alkali metal. The amount of such polyhydrocarbon resin utilized is variable but, in all cases, it is distinctly minor. Generally speaking, the amount of said resin used will usually fall within the range of from about 0.5 to 4 weight percent, preferably about 0.8 to 1.5%, based upon the weight of the alkali metal in the dispersion, with about 1% being a good average.

While the various alkali metals can be used, notably sodium, potassium and lithium as well as mixtures thereof, to make the dispersions in the inert liquid hydrocarbons, the invention has its greatest utility, generally speaking, in the production of stabilized lithium metal dispersions.

Illustrative of the inert liquid hydrocarbons in which the alkali metals are dispersed are mineral oils, petrolatum or petroleum jelly, tetrahydronaphthalene, paraffin waxes, hexane, cyclohexane, heptane, octane, isooctane, benzene, toluene, and, in general, aliphatic, cycloaliphatic, araliphatic and aromatic liquid hydrocarbons. Exemplary of the mineral oils are those having a viscosity in the range of 35 to 90 SUS measured at 100° F.

The proportions of alkali metal and inert liquid hydrocarbon dispersing medium are quite variable but, in general, the alkali metal will constitute from about 5 to about 50%, and, better still, from about 20 to about 35%, by weight, of the dispersion of the alkali metal in the inert liquid hydrocarbon.

The following examples are illustrative of the production of improved alkali metal dispersions in accordance with the present invention but they are not to be construed as in any way limitative of the full scope of the invention since various changes can be made in the light of the guiding principles and teachings contained herein. All temperatures recited are in degrees C.

EXAMPLE 1

To a 500 ml. stainless steel dispersion pot was added 50 g. of lithium metal and 117 g. of light mineral oil. The apparatus was fitted with a 4-necked stainless steel head, argon inlet and outlet tubes, dial thermometer and Cowles dissolver stirrer powered by a high-speed (18,000 r.p.m.) flexible-drive motor. The mixture was heated to 200° and stirred for 5 minutes. Half (0.25 g.) of the dispersing agent, "Dow QX–3487" resin, was then added and the stirring continued for another 5 minutes. The remainder of the dispersing agent (0.25 g.) was added and the mixture stirred for an additional 5 minutes. The stirring was then stopped and the apparatus allowed to cool to room temperature. The dispersion had a particle size of 10 microns or less, of high uniformity. The dispersion was washed free of oil with dry n-hexane. The filtration rate was rapid, giving a free-flowing, oil-free lithium powder on drying.

EXAMPLE 2

To a 500 ml. Morton cleaved flask equipped with a high-speed stirrer was added 233 g. of light mineral oil. A gas-sweep system was added and the system purged thoroughly with dry argon. The system was also equipped with a thermocouple. The dispersing agent, "Dow QX–3487" (1 g. 1 wt. percent based on metal), was then added. Potassium metal (100 g.) in the form of sticks was added and the flask was heated slowly by means of a heating mantle to 65° without stirring. The heat was then reduced in order to keep the temperature in the 65–70° range. The stirrer was started as soon as the metal had melted completely. The stirrer was run at full speed (17,000 r.p.m.) for 5 to 10 minutes until an even dispersion with a blue gray color was present. Then the stirring was stopped and the flask cooled to room temperature. Filtration was steady, and the metal powder produced could be washed easily.

What is claimed is:

1. In a method of preparing a stable dispersion in liquid form of at least one finely divided alkali metal in an inert liquid hydrocarbon, the step which comprises effecting admixing of the alkali metal in molten form in an inert liquid hydrocarbon to effect the dispersion of said alkali metal therein, said admixing being effected in the presence of from about 0.5 to 4% of a polyhydrocarbon resin, based on the weight of the alkali metal, which is soluble or colloidally dispersible in said inert liquid hydrocarbon at ordinary or room temperatures.

2. The method of claim 1 in which the inert liquid hydrocarbon is a mineral oil having a viscosity in the range of 35 to 90 SUS measured at 100° F.

3. The method of claim 1 in which the polyhydrocarbon resin is a cross-linked polystyrene resin.

4. The method of claim 2 in which the polyhydrocarbon resin is a cross-linked polystyrene resin.

5. The method of claim 3 in which the polystyrene resin is used in an amount of from 0.8 to 1.5% based on the weight of the alkali metal.

6. A stable dispersion in liquid form of at least one finely divided alkali metal in an inert liquid hydrocarbon, said dispersion containing, as a dispersing agent, from about 0.5 to 4% of a polyhydrocarbon resin, based on the weight of the alkali metal, which, at ordinary or room temperatures, remains dissolved or colloidally dispersed in said inert liquid hydrocarbon.

7. The dispersion of claim 6 in which the inert liquid hydrocarbon is a mineral oil having a viscosity in the range of 35 to 90 SUS measured at 100° F.

8. The dispersion of claim 6 in which the polyhydrocarbon resin is a cross-linked polystyrene resin.

9. The dispersion of claim 7 in which the polyhydrocarbon resin is a cross-linked polystyrene resin.

10. The dispersion of claim 9 in which the cross-linked polystyrene resin is present in an amount of from 0.8 to 1.5% based on the weight of the alkali metal.

References Cited

UNITED STATES PATENTS

| | | | |
|---|---|---|---|
| 1,998,350 | 4/1935 | Wulff | 252—99 |
| 2,072,120 | 3/1937 | Mikeska et al. | 252—99 |
| 2,628,187 | 2/1953 | Frohmader et al. | 260—33.6 |
| 2,910,347 | 10/1959 | Esmay | 23—9 |

MORRIS LIEBMAN, Primary Examiner

J. H. DERRINGTON, Assistant Examiner